(12) United States Patent
Hohnbaum

(10) Patent No.: US 10,914,399 B1
(45) Date of Patent: Feb. 9, 2021

(54) SYSTEM AND APPARATUS FOR CONTROLLING FLUID FLOW IN DRAINAGE SYSTEMS

(71) Applicant: Jeremy Hohnbaum, Dana Point, CA (US)

(72) Inventor: Jeremy Hohnbaum, Dana Point, CA (US)

(*) Notice: Subject to any disclaimer, the term of this patent is extended or adjusted under 35 U.S.C. 154(b) by 7 days.

(21) Appl. No.: 16/528,284

(22) Filed: Jul. 31, 2019

(51) Int. Cl.
*F16K 33/00* (2006.01)
*F16L 55/10* (2006.01)
*F16T 1/22* (2006.01)
*F16K 31/20* (2006.01)
*F16K 31/18* (2006.01)
*F16K 31/22* (2006.01)

(52) U.S. Cl.
CPC .............. *F16K 33/00* (2013.01); *F16L 55/10* (2013.01); *F16K 31/18* (2013.01); *F16K 31/20* (2013.01); *F16K 31/22* (2013.01); *F16T 1/22* (2013.01); *Y10T 137/7358* (2015.04); *Y10T 137/7847* (2015.04); *Y10T 137/7848* (2015.04); *Y10T 137/7898* (2015.04); *Y10T 137/791* (2015.04); *Y10T 137/7903* (2015.04)

(58) Field of Classification Search
CPC .................. F16T 1/22; Y10T 137/7847; Y10T 137/7898; Y10T 137/7358; Y10T 137/791; Y10T 137/7848; Y10T 137/7903; F16L 55/10; F16K 33/00; F16K 31/20; F16K 31/18; F16K 31/22
See application file for complete search history.

(56) References Cited

U.S. PATENT DOCUMENTS

| | | | | | |
|---|---|---|---|---|---|
| 186,533 | A | * | 1/1877 | Boldemann | F02M 1/00 137/409 |
| 207,676 | A | * | 9/1878 | Pitt | E03C 1/284 137/247.17 |
| 265,310 | A | * | 10/1882 | Dyer | F02M 1/00 137/409 |
| 608,450 | A | * | 8/1898 | Godfrey | F16K 15/03 137/527.4 |
| 745,742 | A | * | 12/1903 | Taube | F16K 15/03 137/527.4 |
| 1,539,180 | A | * | 5/1925 | Gore | F16K 31/20 141/216 |
| 1,577,637 | A | * | 3/1926 | Hess | F16K 15/03 137/240 |
| 1,606,396 | A | * | 11/1926 | Blom | E03F 7/04 137/409 |

(Continued)

*Primary Examiner* — Marina A Tietjen
*Assistant Examiner* — Frederick D Soski
(74) *Attorney, Agent, or Firm* — Rutan & Tucker, LLP

(57) ABSTRACT

A fluid control system to control fluid flow within a drainage system is provided that includes a fluid control device configured to couple to an interior wall of a cylindrical structure of the drainage, and a coupling mechanism configured to couple the fluid control device to the interior wall, wherein, while in a resting state, the fluid control device is configured to at least partially cover an aperture of the interior wall. When fluid contacts the fluid control device at a flow rate of at least a flow threshold, the fluid control device is configured to at least partially uncover the aperture of the interior wall. The fluid control device has a spherical shape, wherein a diameter of the fluid control device has a diameter that is greater than or equal to a diameter of the aperture.

23 Claims, 3 Drawing Sheets

(56) References Cited

U.S. PATENT DOCUMENTS

| | | | | |
|---|---|---|---|---|
| 1,700,234 | A * | 1/1929 | McCrosky | F16K 15/04 137/533.11 |
| 1,721,353 | A * | 7/1929 | Oxford | F16K 15/048 137/527 |
| 1,755,458 | A * | 4/1930 | Oleszko | E03F 5/042 210/119 |
| 1,763,466 | A * | 6/1930 | Khun | E03C 1/288 137/409 |
| 1,827,913 | A * | 10/1931 | Rymal | F16K 15/03 137/527.8 |
| 1,924,498 | A * | 8/1933 | House | E03C 1/304 137/240 |
| 2,211,296 | A * | 8/1940 | Shaft | E03B 11/02 137/390 |
| 2,303,808 | A * | 12/1942 | Wolcott | F16K 15/03 210/119 |
| 2,546,963 | A * | 4/1951 | Black | F04D 15/0083 405/94 |
| 2,616,512 | A * | 11/1952 | Coon | E03F 7/04 137/409 |
| 2,972,412 | A * | 2/1961 | Lundeen | C02F 1/42 210/123 |
| 2,990,845 | A * | 7/1961 | Sklash | E03F 7/04 137/358 |
| 3,005,465 | A * | 10/1961 | Whitlock | F16K 31/20 137/391 |
| 3,105,516 | A * | 10/1963 | Werra | F16K 15/04 137/533.11 |
| 3,550,612 | A * | 12/1970 | Maxon | F01P 3/205 137/112 |
| 3,723,996 | A * | 4/1973 | Raible | A61F 2/2424 623/2.35 |
| 3,934,608 | A * | 1/1976 | Guyton | F16K 15/03 137/527.8 |
| 3,937,240 | A * | 2/1976 | Nanny | F16K 15/03 137/527.8 |
| 3,945,394 | A * | 3/1976 | Sullivan | F16K 17/0406 137/430 |
| 4,007,710 | A * | 2/1977 | Johnson | A01J 9/06 119/14.03 |
| 4,030,520 | A * | 6/1977 | Sands | F16K 15/048 137/513.5 |
| 4,039,004 | A * | 8/1977 | Luthy | F16K 15/03 137/527 |
| 4,054,153 | A * | 10/1977 | Guyton | F16K 15/03 137/527 |
| 4,063,570 | A * | 12/1977 | Mitchell | F16K 15/031 137/454.2 |
| 4,128,111 | A * | 12/1978 | Hansen | F16K 15/03 137/515.7 |
| 4,498,876 | A * | 2/1985 | Zemlicka | F01N 13/085 137/527.8 |
| 4,501,292 | A * | 2/1985 | Maloblocki | F16K 15/04 137/533.11 |
| 4,502,503 | A * | 3/1985 | Karpenko | F16K 15/03 137/527.8 |
| 4,535,800 | A * | 8/1985 | Leech | E03F 1/006 137/192 |
| 4,667,711 | A * | 5/1987 | Draft | F16K 21/18 137/448 |
| 4,984,719 | A * | 1/1991 | Brunton | B67D 3/00 137/513.5 |
| 5,143,113 | A * | 9/1992 | Scaramucci | F16K 15/03 137/315.01 |
| 5,150,733 | A * | 9/1992 | Scaramucci | F16K 15/03 137/454.2 |
| 5,156,182 | A * | 10/1992 | Scaramucci | F16K 15/03 137/454.2 |
| 5,156,183 | A * | 10/1992 | Scaramucci | F16K 15/033 137/454.2 |
| 5,159,953 | A * | 11/1992 | Sato | B60K 15/04 137/454.2 |
| 5,161,566 | A * | 11/1992 | Scaramucci | F16K 15/03 137/328 |
| 5,172,888 | A * | 12/1992 | Ezekoye | F16K 15/03 137/527.8 |
| 5,341,840 | A * | 8/1994 | Manson | F16K 15/03 137/527.8 |
| 5,406,972 | A * | 4/1995 | Coscarella | E03F 7/04 137/315.08 |
| 5,522,423 | A * | 6/1996 | Elliott | F16K 15/03 137/515.7 |
| 5,709,242 | A * | 1/1998 | Bergen | F16K 15/04 137/533.11 |
| 5,727,999 | A * | 3/1998 | Lewis | B60H 1/249 137/527.8 |
| 6,931,882 | B1 * | 8/2005 | Yang | F16T 1/22 62/285 |
| 8,096,318 | B2 * | 1/2012 | Coscarella | F16K 15/03 137/527.8 |
| 9,353,569 | B1 * | 5/2016 | Anderson, Jr. | E04H 9/145 |
| 9,376,803 | B1 * | 6/2016 | Anderson, Jr. | E04B 1/7069 |
| 10,113,309 | B2 * | 10/2018 | Anderson, Jr. | E04B 1/7076 |
| 10,626,585 | B1 * | 4/2020 | Sullivan | F16K 37/0033 |
| 2005/0284522 | A1 * | 12/2005 | Palle | G01D 11/24 137/554 |
| 2007/0044847 | A1 * | 3/2007 | Yang | F16K 15/03 137/527.8 |
| 2010/0078083 | A1 * | 4/2010 | Coscarella | F16K 27/0209 137/527 |
| 2011/0017316 | A1 * | 1/2011 | Kelly | F16K 15/03 137/215 |
| 2012/0132299 | A1 * | 5/2012 | Cyliax | F16K 27/0227 137/527 |
| 2012/0180881 | A1 * | 7/2012 | Humphreys | F16K 33/00 137/561 R |
| 2013/0206256 | A1 * | 8/2013 | Trudel | F16K 15/033 137/527 |
| 2013/0233412 | A1 * | 9/2013 | Moren | F16K 15/03 137/527.8 |
| 2013/0306163 | A1 * | 11/2013 | Hubbard, Sr. | B08B 5/02 137/237 |
| 2014/0109993 | A1 * | 4/2014 | Kelly | E03F 5/042 137/409 |
| 2015/0300524 | A1 * | 10/2015 | Konegger | A61M 1/3627 210/436 |
| 2018/0112780 | A1 * | 4/2018 | Rain | F16K 1/2071 |

\* cited by examiner

SYSTEM AND APPARATUS FOR CONTROLLING FLUID FLOW IN DRAINAGE SYSTEMS

FIELD

The field of the invention are systems for controlling fluid flow such as a gas or liquid.

GENERAL BACKGROUND

The background description includes information that may be useful in understanding the present invention. It is not an admission that any of the information provided in this application is prior art or relevant to the presently claimed invention, or that any publication specifically or implicitly referenced is prior art.

As is often the case with drainage systems, a first pipe is connected to a second pipe so that fluid may flow between the pipes. However, when the fluid flow is low or ceases altogether, one or more pipes may be left with standing water, which is an ideal breeding ground for mosquitos, as well as other insects or reptiles. Additionally, some reptiles may be found in this standing water, posing hazards for humans that may be forced to enter the drainage system, e.g., to repair or replace pipes.

Therefore, a system that prevents access from a first pipe into a second pipe when fluid flow is minimal or nonexistent would be advantageous is solving the problem set forth above. Specifically, there is a need in the art for systems and apparatuses that control or restrict fluid flow and drainage.

SUMMARY OF THE INVENTION

The present invention discloses apparatuses and systems directed to fluid control systems. In particular, the fluid control system includes a fluid control device, which in one embodiment, may be a plug or flap gate. The fluid control device may include an object configured to couple with an interior wall of a pipe or cylindrical structure and block an aperture of the interior wall. For example, the aperture may represent a distal end of a second pipe or cylindrical structure such that fluid may flow between the first cylindrical structure and the second cylindrical structure. In some embodiments, the coupling may allow the fluid control device to hang (e.g., a resting state) such that the fluid control device blocks fluid flow between the first cylindrical structure and the second cylindrical structure. In some embodiments, the coupling may be accomplished through the use of a chain, string, tape, chord, wire, rope, or any other length of material as will be discussed below.

The coupling of the fluid control device may also enable the fluid control device to transition from the resting sate to a raised position as a result of the force of the fluid flow, thereby allowing flow between the first cylindrical structure and the second cylindrical structure. In some embodiments, the fluid control device is shaped to seal the aperture on the interior wall. As should be understood, fluid flow having a force above a flow threshold will cause the fluid control device to transition from the resting state to the raised position (e.g., fluid flowing from the second pipe toward the first pipe with a particular force will move the fluid control device). However, fluid flow having a force below the flow threshold will not move fluid control device and remain in the second pipe. In particular, the fluid control system prevents unwanted items (e.g., mosquitos or other animals/insects) from freely moving about a piping system. In particular, fluid, such as water, may continuously drip at a very low flow rate (and at times no flow rate, which results in standing water) within the second pipe toward the first pipe thereby creating an ideal breeding ground for insects such as mosquitos. The fluid control system disclosed herein prevents the creation of such a breeding ground. As in known in the art, fluid flow rate may be measured in, for example, cubic feet per second (cfs), cubic meters per second (cms), gallons per minute (gpm), etc.

In some embodiments, when fluid contacts the fluid control device and builds a hydrostatic force (i.e. head) or a hydrodynamic force at a flow rate of at least a flow threshold, the fluid control device is configured to (i) at least partially uncover the aperture of the interior wall, or (ii) further uncover the aperture of the interior wall. The flow rate may be dependent on the weight and/or buoyancy of the fluid control device. More particularly, the fluid control device may be configured with a specific weight and/or buoyancy in order to block fluid flow until the fluid flow reaches a certain flow rate and/or or head upstream of the aperture.

In additional embodiments, fluid, e.g., water, may rise within the first pipe from below the aperture. The buoyancy of the fluid control device may be such that the rising fluid levels may cause the fluid control device to rise with the fluid level, which at least partially unblocks the aperture thereby enabling some fluid to flow from the first pipe to the second pipe.

In another aspect of the inventive subject matter, another configuration is contemplated wherein the fluid control device may also be configured to be encapsulated or contained within a cage or frame where said cage is attached/mounted to a wall and configured to allow the object to freely move within the cage from a resting position where the fluid control device covers or plugs an aperture in the wall to an alternate position where the object is no longer covering the aperture and allowing fluid to flow from the aperture into the interior of the cylindrical structure. The fluid control device may be dislodged from the resting position due to the application of a force (e.g., fluid flow) either (1) arising within the cylindrical structure, or (2) flowing from a pipe or second cylindrical structure and contacting the fluid control device via the aperture of the cylindrical structure.

In some embodiments, the object includes a feature to allow fluid flow past the object while the object rests against the wall covering the through hole. In some embodiments, the object is connected to a line where the line is coupled to a wall or surface with a hinge by a linkage.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

Embodiments of the disclosure are illustrated by way of example and not by way of limitation in the figures of the accompanying drawings, in which like references indicate similar elements and in which.

DETAILED DESCRIPTION

Figure 1:
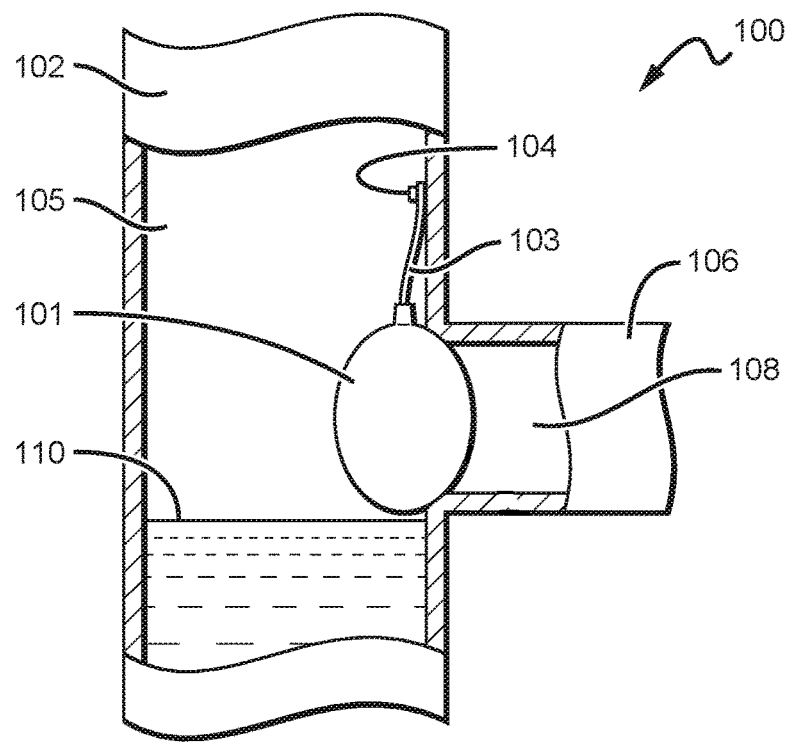
FIG. 1 is a perspective view of a cylindrical structure having a horizontal pipe or culvert attached to the side wall of the cylindrical structure, according to some embodiments.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Several embodiments of the inventive subject matter are described in detail in this application. The overarching purpose of the inventive subject matter described in this application is to create a device to control the amount of fluid (e.g., a gas or liquid) to be conveyed from or into, for example, a pipe and/or to allow for fluid to drain from, for example, a pipe. It is contemplated that any feature described with respect to one embodiment can also be applied to the other embodiment, even if it is not explicitly stated as being a feature of the other embodiment.

Fluid control devices attached to a wall or surface via a line of the inventive subject matter include at least a fluid control device (that may or may not be buoyant), a line, a linkage, and a hinge. The plug is typically formed to take the shape of the aperture the plug is covering and/or the wall that it is to rest against (e.g., a flat surface, irregularly shaped surface, or a circular cross section so that it can couple with a cylindrical drain pipe). The fluid control device is sized and dimensioned to at least cover the opening of the through hole, and it is attached with the wall by a line and linkage and at least one hinge.

Fluid control devices contained within a frame where said frame is attached to a wall or surface, of the inventive subject matter include at least a fluid control device, a framed cage, and a linkage or means to attach the cage to a structural wall. The plug is typically formed to take the shape of the aperture the plug is covering and/or the wall that it is to rest against (e.g., a flat surface, irregularly shaped surface, or a circular cross section so that it can couple with a cylindrical drain pipe). The fluid control device is sized and dimensioned to at least cover the opening of the through hole. The cage which the fluid control device is contained within is attached to the wall via bolts or screws. The cage is shaped to allow the fluid control device to rise and fall within the cage when a buoyant force dislodges the object from a resting position. When dislodged from the resting position allows fluid from or into a through hole depending on the design location.

Referring to FIG. 1, a perspective view of a cylindrical structure having a horizontal pipe or culvert attached to the side wall of the cylindrical structure and a fluid control system is shown according to some embodiments. The fluid control system disclosed includes a fluid control device 101, a linkage 103 and a wall attachment 104. The fluid control device 101 may also be seen in FIGS. 2 and 4-6, each discussed below. The fluid control device 101 may match the cross-sectional shape of an interior wall 105 of the first cylindrical structure 102 (referred to herein for purposes of clarity as a "pipe") against which the fluid control device 101 rests. The embodiments shown in FIGS. 1, 2 and 4-6 include a fluid control device 101 having a circular cross-sectional shape, but it is contemplated that any other cross-sectional shapes can be implemented, which typically will depend on the shape of the interior wall 105 (e.g., a drain pipe having a circular cross-sectional shape). There is no required cross-sectional shape for embodiments of the inventive subject matter, but one common application— pipes 106—are typically cylindrical and therefore have a circular cross-sectional shape.

The fluid control device 101 rests against the interior wall 105 (e.g., blocking the aperture 108) as a result of gravity in conjunction with a linkage 103 that facilitates the fluid control device 101 to "fall" shut. It is contemplated that the bottom portion of the opening of the fluid control device 101 can protrude farther out than the top edge of the opening of the fluid control device 101 so that there is slightly more force (e.g., a force normal to the surface that the door rests against).

In some embodiments, the fluid control device has a spherical shape. Additionally, in some embodiments, the fluid control device 101 having a spherical shape has a radius of curvature that is substantially similar to a radius of curvature of the interior wall 105 of the first pipe 102. Additionally, in some embodiments in which the fluid control device 101 has a spherical shape, a diameter of the fluid control device 101 may be greater than or equal to a diameter of the aperture 108.

In some embodiments, the fluid control device 101 includes a curved side (e.g., only a portion of the fluid control device is curved), wherein the curved side has a radius of curvature that is substantially similar to a radius of curvature of the interior wall 105 of the first pipe 102. Additionally, in some embodiments in which a portion of the fluid control device 101 that is adjacent to the interior wall 105 is curved, a diameter of the curved portion may be greater than or equal to a diameter of the aperture 108.

It should be noted that it is not required for the fluid control device 101 to have a constant curvature, and, instead, the curvature of the fluid control device 101 can vary across different points of the fluid control device 101 to better match an installation location. The fluid control device 101 can also be made of a material that allows the fluid control device 101 to flex or mold itself to the shape of the wall which it rests against.

To couple the fluid control device 101 with the wall 105, a linkage 103 and wall attachment 104 is provided. Some embodiments can include a linkage 103, as shown in FIGS. 1, 2 and 4-6. The linkage 103 allows the fluid control device 101 to swing open or become dislodged to allow fluid to flow out of the aperture 108 in the wall 105. In some embodiments, there may be multiple linkages 103 coupled with the wall 105 via the wall attachment 104, which in some embodiments may comprise at least a screw or bolt as shown as item 400 in FIG. 4.

Linkages 103 of the inventive subject matter can include one or several components, but regardless of the quantity of components comprising, or the configuration of, the linkage 103, the primary purpose of a linkage 103 as described in this application is to couple the fluid control device 101 with an interior wall 105 so that when the fluid control device is in a resting state the aperture 108 is at least partially blocked. For example, a linkage can be a single line or link coupling the hinge to the fluid control device, or it can include two or more lines/links.

Further, FIG. 1 illustrates that fluid may build up from time to time within the first pipe 102 as seen by the fluid level 110 (e.g., water level).

Figure 2:
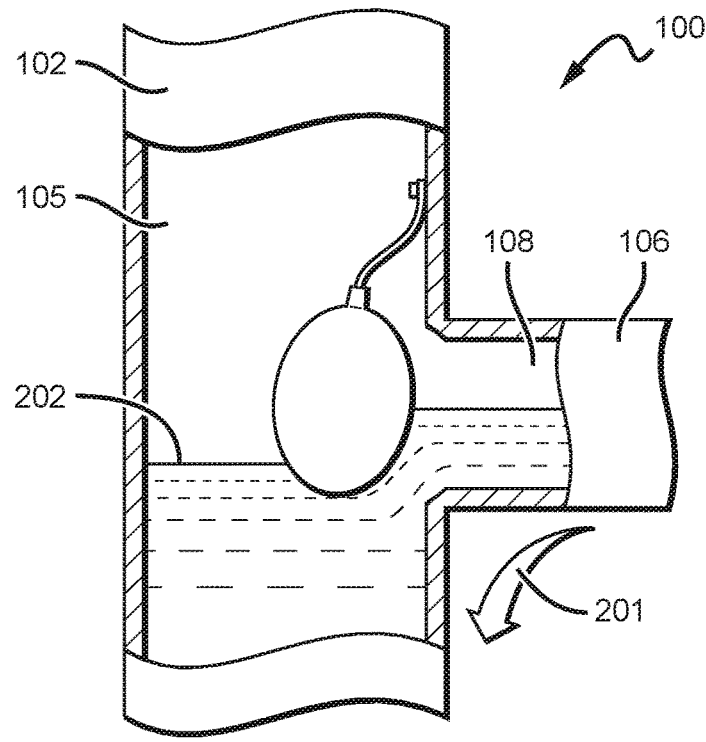
FIG. 2 is a perspective view of the cylindrical structure of FIG. 1 having a fluid control device coupled thereto wherein fluid is flowing into the cylindrical structure, according to some embodiments.

Referring to FIG. 2, a perspective view of the cylindrical structure of FIG. 1 having a fluid control device coupled thereto wherein fluid is flowing into the cylindrical structure is shown according to some embodiments. FIG. 2 specifically illustrates how the fluid control system is configured to enable the fluid control device 101 to transition from a resting state (as seen in FIG. 1) to a raised position. As is seen, the fluid level 110 of FIG. 1 has risen to the fluid level 202 due to the fluid flow 201. However, it should be noted that the fluid may not build up within the first pipe 102; thereby, neither of the fluid levels 110 nor 202 would be present. In such situations, the force of the fluid 201 would need to be sufficient to move the fluid control device 101 from the resting state to the raised position.

Figure 3A:
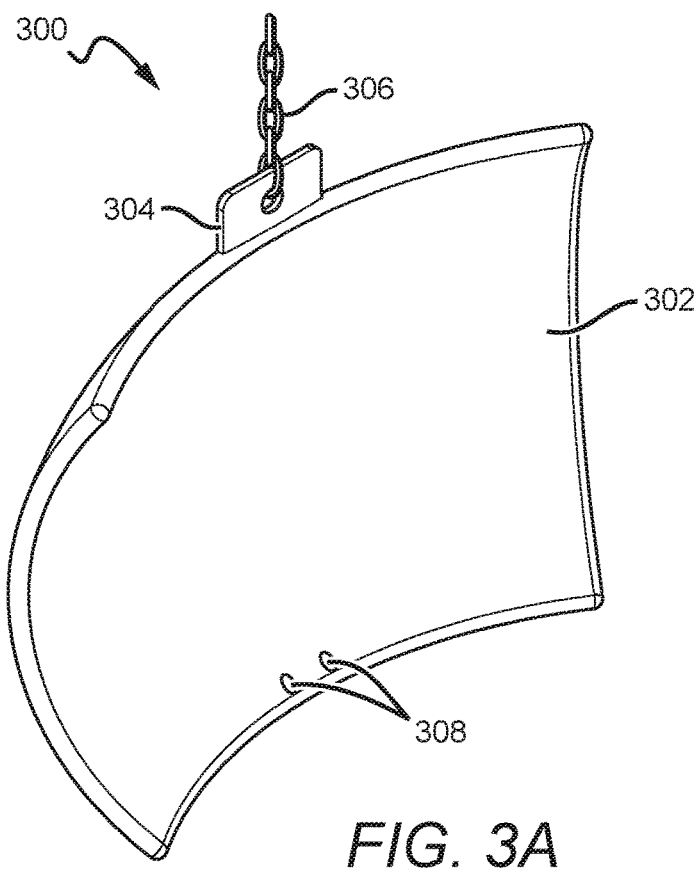
FIGS. 3A-3B illustrate an alternative embodiment of the fluid control device of FIGS. 1-2, according to some embodiments.
Figure 3B:
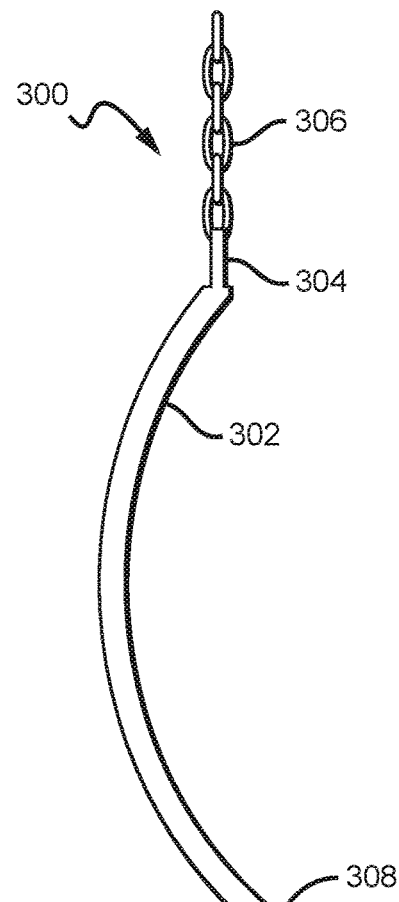

Referring to FIGS. 3A-3B, illustrations of an alternative embodiment of the fluid control device of FIGS. 1-2 are shown according to some embodiments. It is contemplated that the fluid control device could take on a shape similar to that of a plate or cover as shown in FIGS. 3A-3B. It is contemplated that some embodiments of the cover 302 can include slots 308, cutouts, holes, or any other form of fluid-pervious feature within the bottom area of the plate cover to allow fluid to flow out of the plate cover even when the cover 302 is in the resting position and the through hole is covered. This feature can facilitate draining of fluid through the fluid control device when there is insufficient pressure head to cause the fluid control device to open. The cover 302 may be attached via a line or linkage 306 which is attached to the cover 302 via some type of weld, coupling mechanism or other connection 304 to allow the cover to swing open or become dislodged due to a buoyant force similar to the fluid control device described in FIGS. 1, 2 and 4-6.

In addition, various embodiments of the fluid control device disclosed herein may be specifically configured such that its weight facilitates the fluid control device's return to the resting state once the force of the fluid flow has decreased below a flow threshold required to move the fluid control device as discussed herein. For example, a weight in the form of additional material may be placed on opposing horizontal sides of the cover 302 in order to facilitate the return of the cover 302 to the resting state. In some embodiments, for example when the cylindrical structure is formed of a metallic material, the fluid control device may include one or more magnets that facilitate the return of the fluid control device to the resting state. Additionally, a magnet embedded into the fluid control device, such as at a distal point relative to the wall coupling aids in preventing the fluid control device from shifting from the resting state without a sufficient fluid flow force coming in contact with the fluid control device.

In yet other embodiments, the fluid control system may include a coupling mechanism that includes a first component that attaches to the interior wall of the first pipe or an interior wall of the second pipe and a second component include on or attached to the fluid control device that couples with the first component. For example, the first and second components may comprise a latching mechanism that is opened upon application of at least a threshold amount of force applied to the latching mechanism (or to the fluid control device), such as the flow threshold discussed herein. Similarly, the fluid control device may include a second linkage providing a second attachment point to the interior wall of the first pipe or the interior wall of the second pipe. Such an embodiment would enable control of the amount of fluid that flows between the first and second pipes at any given time (i.e., the second linkage may comprise a chain having a predetermined length; thus, restricting the opening created by the fluid flow).

Figure 4:
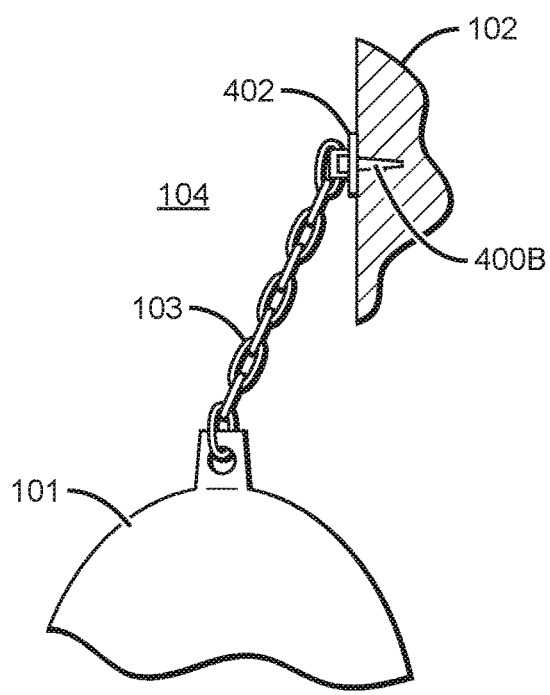
FIG. 4 is a side view showing an exemplary coupling of the fluid control device with a wall of the cylindrical structure of FIG. 1, according to some embodiments.

Referring now to FIG. 4, a side view showing an exemplary coupling of the fluid control device with a wall of the cylindrical structure of FIG. 1 is shown according to some embodiments. FIG. 4 illustrates a detailed view of the coupling of the fluid control device 101 to the wall 105 via the linkage 103. In the embodiment shown, the linkage 103 couples to the fluid control device 101 through an opening of the control device, e.g., wherein the fluid control device 101 and the opening are part of a single component formed via through injection-molding. The linkage 103 may be coupled to the wall 105 by way of a mounting plate 402 and a fastener 400. Specifically, the linkage 103 may couple to the mounting plate 402 (e.g., via an opening therein) and the mounting plate 402 may be coupled to the wall via the fastener 400. It should be noted that the length of the linkage 103 may vary and that the figures are not intended to provide any limitations thereon.

Figure 5:
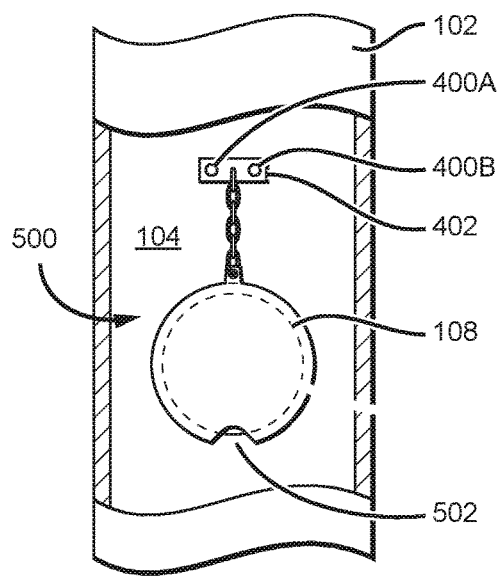
FIG. 5 is a front sectional view illustrating an interior of the cylindrical structure of FIGS. 1-2, wherein the drainage control coupled thereto to control fluid flow from an aperture of a horizontal pipe or culvert that opens into the interior of the cylindrical structure, according to some embodiments.

Referring to FIG. 5, a front sectional view illustrating an interior of the cylindrical structure of FIGS. 1-2, wherein the drainage control coupled thereto to control fluid flow from an aperture of a horizontal pipe or culvert that opens into the interior of the cylindrical structure is shown according to some embodiments. FIG. 5 illustrates the mounting plate 402 being attached to the wall 105 via fasteners 400A and 400B. It is contemplated that fluid control device 500 can include one or more features, for example, an opening 502 as shown in FIG. 5, at the bottom portion to facilitate fluid flow even when insufficient fluid has built up behind the fluid control device 500 to dislodge the fluid control device 500 to allow fluid into or out of the interior 104 of the first pipe 102. The feature can be, for example, one or more apertures, a mesh portion, or the opening 502 as shown in FIG. 5. Additionally, a mesh screen may be placed across the feature 502 in order to prevent insects from moving between the first pipe 102 and the second pipe 106.

Additional embodiments of the features have been contemplated as alternatives or additions to the opening 502, which may include slots, holes, mesh screens, or any other form of fluid-pervious feature within the bottom area of the fluid control device to allow fluid flow. Such an opening 502 can facilitate draining of fluid through the fluid control device 101 when there is insufficient pressure to cause the fluid control device 101 to open or a lack of buoyant force from beneath the fluid control device 101 to cause the fluid control device 101 to rise.

Figure 6A:
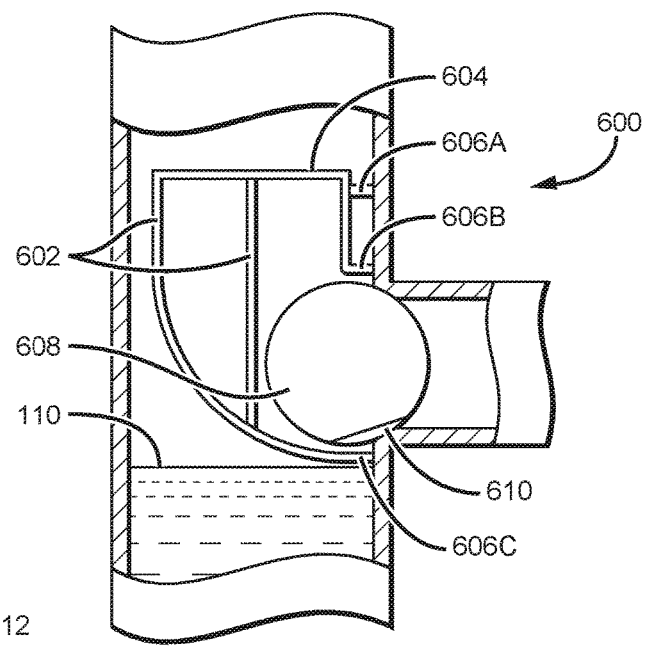
FIG. 6A is a perspective view of cylindrical structure with a first example fluid control device secured in its resting position by a cage or frame where said frame is securely attached to the wall of said structure, according to some embodiments.
Figure 6B:
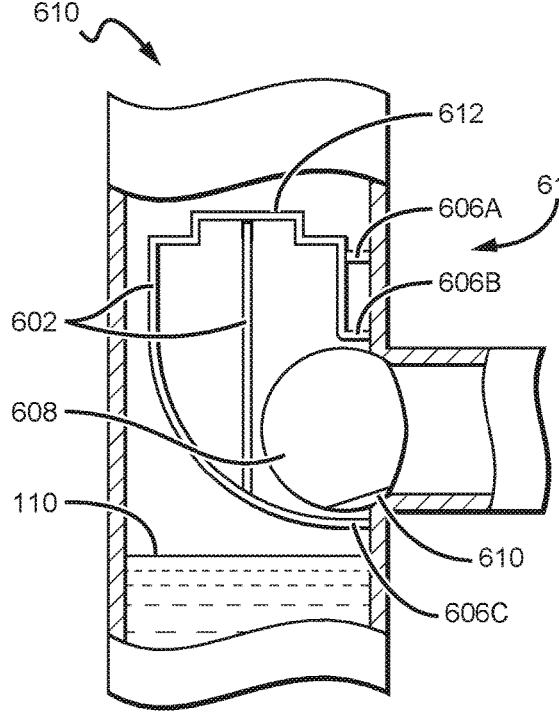
FIG. 6B is a perspective view of cylindrical structure with a second example fluid control device secured in its resting position by a cage or frame where said frame is securely attached to the wall of said structure, according to some embodiments.

Referring now to FIGS. 6A-6B, a fluid control system 600 including a fluid control device 608 contained within a frame or cage 602 attached to the wall 105 is shown according to some embodiments. The fluid control device 608 is typically formed to take the shape of the wall that it is to rest against (e.g., a circular cross section so that it can couple with a cylindrical drain pipe). The fluid control device 608 is sized with dimensions to at least cover the aperture of the second pipe 106 (e.g., having a diameter that is slightly larger than the diameter of the aperture 108). For instance, the diameter of the fluid control device 108 may be 1%, 2%, 5% or 10% larger than the diameter of the aperture 108. However, the disclosure is not intended to be limited to the recited percentages.

The cage 602 is shaped to allow the fluid control device 608 to rise and fall within the cage 602 when a force contacts the fluid control device 608; thus, moving the fluid control device 608 from a resting position to a raised position. The force may be fluid flow 201 as seen in FIG. 2, or simply a raising fluid level 110. When dislodged from the resting position, the fluid control device 608 allows fluid to move through the aperture 108 between the first pipe 102 and the second pipe 106. As shown in FIG. 6A, the top 604 of the cage 602 may be solid to prevent the fluid control device 608 from escaping the confines of the cage 602. Alternatively, the top 604 may comprise one or more bars or a mesh top that prevent the fluid control device 608 from escaping the confines of the cage 602. Referring to FIG. 6B, the cage 602 can be configured with a narrow top 612 to prevent the fluid control device 608 from escaping the confines of the cage 602. When no fluid is within the structure or the fluid is at a level similar to 110 in FIG. 1, the fluid control device 608 falls back to the resting location to restrict fluid from moving through the aperture 108. Referring generally to FIGS. 6A-6B, the cage 602 encapsulates the fluid control device 608 within a defined space by at least partially surrounding the fluid control device 608.

In some embodiments, one example of a drainage plug or cover of the inventive subject matter, the plug or cover is attached to a drainage system for a retaining wall. The plug or cover can be useful on such a drainage system to prevent animals or insects from crawling or flying into the pipe, and also to improve the aesthetics of the drainage system so that it better matches the wall where the plug or cover is mounted. When fluid flows through the drainage system, it flows out of the pipe that the fluid control device is attached to. The fluid control device may also be located on the upstream end of a pipe, covering an aperture, to restrict fluid from exiting the pipe in the absence of a buoyant force which would dislodge the fluid control device in the same manner when the object is on the downstream end of the pipe as previously discussed.

Thus, specific embodiments of drainage plug have been disclosed. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A fluid control system to control fluid flow within a drainage system, the fluid control system comprising:
    a float device coupled to a structure of the drainage system, wherein the float device has a spherical shape or an oval shape and includes a fluid-pervious feature, and wherein the float device has sufficient buoyancy such that at least a portion of the float device floats above a liquid; and
    a coupling mechanism being a tether, wherein the tether couples the float device to the structure of the drainage system, wherein, while in a resting state, the float device at least partially covers an aperture of the structure of the drainage system.

2. The fluid control system of claim 1, wherein when fluid contacts the float device at a flow rate of at least a flow threshold, the fluid control device is configured to at least partially uncover the aperture of the interior wall.

3. The fluid control system of claim 1, wherein the fluid-pervious feature allows fluid flow through the aperture while the float device is in the resting state.

4. The fluid control system of claim 1, wherein the tether includes a linkage and one or more fasteners.

5. The fluid control system of claim 4, wherein the linkage of the tether includes a chain.

6. The fluid control system of claim 1, wherein the fluid-pervious feature includes one or more slots, one or more cutouts or one or more holes.

7. The fluid control system of claim 1, wherein the tether is configured to couple the float device to an interior wall of the structure of the drainage system.

8. The fluid control system of claim 1, wherein a diameter of the fluid control device having a spherical shape is greater than or equal to a diameter of the aperture.

9. The fluid control system of claim 1, wherein the float device is configured to raise from the resting state in accordance with a rising fluid level within the structure.

10. A fluid control system to control fluid flow out of an aperture of a wall, the fluid control system comprising:
- a float device coupled to a location on the wall above the aperture, wherein the float device has a spherical shape or an oval shape and includes a fluid-pervious feature, and wherein the float device has sufficient buoyancy such that at least a portion of the float device floats above a liquid; and
- a coupling mechanism being a tether, wherein the tether couples the float device to the location on the wall, wherein, while in a resting state, the fluid control device at least partially covers the aperture of the wall.

11. The fluid control system of claim 10, wherein when fluid contacts the float device at a flow rate of at least a flow threshold, the float device is configured to further uncover the aperture of the wall.

12. The fluid control system of claim 10, wherein the fluid-pervious feature includes one or more slots, one or more cutouts or one or more holes.

13. The fluid control system of claim 10, wherein a diameter of the fluid control device having a spherical shape is greater than or equal to a diameter of the aperture.

14. The fluid control system of claim 10, wherein the wall comprises a structure, and wherein the float device is configured to rise from the resting state in accordance with a rising fluid level within the structure.

15. A fluid control system to control fluid flow within a drainage system, the fluid control system comprising:
- a float device having a spherical shape or an oval shape and including a fluid-pervious feature, wherein the float device has sufficient buoyancy such that at least a portion of the float device floats above a liquid, and wherein the float device partially restricts fluid flow from an aperture when in a resting state and allows fluid flow without restriction when in an open state, the open state being due to a flow rate of the fluid flow being at least a flow threshold; and
- a coupling mechanism being a tether, wherein the tether couples the float device to a structure of the drainage system.

16. The fluid control system of claim 15, wherein when fluid contacts the float device at a flow rate of at least a flow threshold, the fluid control device is configured to at least partially uncover the aperture of the interior wall.

17. The fluid control system of claim 15, wherein the fluid-pervious feature allows fluid flow through the aperture while the float device is in the resting state.

18. The fluid control system of claim 15, wherein the tether includes a linkage and one or more fasteners.

19. The fluid control system of claim 18, wherein the linkage of the tether includes a chain.

20. The fluid control system of claim 15, wherein the tether is configured to couple the float device to an interior wall of the structure of the drainage system.

21. The fluid control system of claim 15, wherein a diameter of the float device is greater than or equal to a diameter of the aperture.

22. The fluid control system of claim 15, wherein the float device is configured to raise from the resting state in accordance with a rising fluid level within the structure.

23. The fluid control system of claim 15, wherein the fluid-pervious feature includes one or more slots, one or more cutouts or one or more holes.

* * * * *